United States Patent [19]

Marietta et al.

[11] Patent Number: 4,902,047
[45] Date of Patent: Feb. 20, 1990

[54] THREAD CONNECTOR ANTI-ROTATION DEVICE

[75] Inventors: Dale B. Marietta, Singapore, Singapore; Alistair MacDonald, Cowiewynd, Scotland

[73] Assignee: Vetco Gray Inc., Houston, Tex.

[21] Appl. No.: 338,178

[22] Filed: Apr. 14, 1989

[51] Int. Cl.⁴ ............................................. F16L 35/00
[52] U.S. Cl. ........................................ 285/39; 285/92; 285/334
[58] Field of Search ............................ 285/91, 92, 334; 403/343; 411/204, 208, 209, 216, 217, 218, 219, 221, 292, 293, 321

[56] References Cited

U.S. PATENT DOCUMENTS

| 573,044 | 12/1896 | Seely | 411/292 X |
|---|---|---|---|
| 957,576 | 5/1910 | Robinson | 411/217 |
| 1,031,639 | 7/1912 | Funderburg | 411/321 |
| 1,064,527 | 6/1913 | Norris | 285/91 X |
| 1,067,389 | 7/1913 | Webb . | |
| 1,240,245 | 9/1917 | Oller . | |
| 1,578,424 | 3/1926 | Godshalk . | |
| 1,654,637 | 1/1928 | Collins . | |
| 2,234,957 | 3/1941 | Boynton | 285/92 X |
| 3,212,796 | 10/1965 | Neuschotz . | |
| 4,261,599 | 4/1981 | Streed . | |

FOREIGN PATENT DOCUMENTS 2524112 9/1983 France ................................ 285/92

Primary Examiner—Dave W. Arola
Attorney, Agent, or Firm—James E. Bradley

[57] ABSTRACT

A locking device for locking the threaded connection of two tubular members together utilizes a key. The threaded members have an overlapping section. One of the sections has a slot machined in it. A key is driven into this slot. The key fits in an interference fit to secure the members. The key has an enlarged head to enable the key to be extracted if the connection needs to be loosened.

5 Claims, 2 Drawing Sheets

THREAD CONNECTOR ANTI-ROTATION DEVICE

BACKGROUND OF THE INVENTION:

1. Field of the Invention:

This invention relates in general to a locking device for locking two threaded tubular members together, and in particular to a locking device for pipe used in offshore oil production.

2. Description of the Prior Art:

Large diameter pipes are used in offshore oil and gas production and drilling for various purposes. Each pipe has a pin on one end and a box on the other end. The pin and box have conical threads for screwing together. Often, the pin and box will have multistart threads. This allows the members to screw together with less than one full rotation.

As these members make up with only a fraction of a turn, it is important to have some type of locking means to prevent the members from unscrewing from one another. One type of locking means consists in providing tabs in the box member that are machined so that they can be deflected inward. Slots are formed in the pin member. An impact device is used to drive one or more of the tabs into the slots to lock the members together after makeup.

While this is successful, placing the locking tabs in the box member weakens the portion of the box member from the rim to the threads. This area is subject to being damaged from handling.

SUMMARY OF THE INVENTION

In this invention, a separate key is used to lock the box and pin together. At least one slot is formed in the pin immediately above the threads. The box has a smooth cylindrical locking section that encloses this slot. This results in a cavity.

A key is driven into this cavity to lock the members together. The key has a greater radial thickness than the cavity so that it will wedge in place and grip the box member. Preferably, the key has longitudinal sharp teeth or grooves on one side for providing a gripping action.

Also, in one embodiment a head of enlarged dimension is formed on the upper end of the key. This head allows the key to be driven in place. The head also allows the key to be pried loose when the connection is desired to be unscrewed.

In another embodiment, a hole extends through the key. The hole locates above the rim of the box connection. A tool can be inserted into the hole to pull the key loose.

DESCRIPTION OF THE PREFERRED EMBODIMENT

Figure 1:
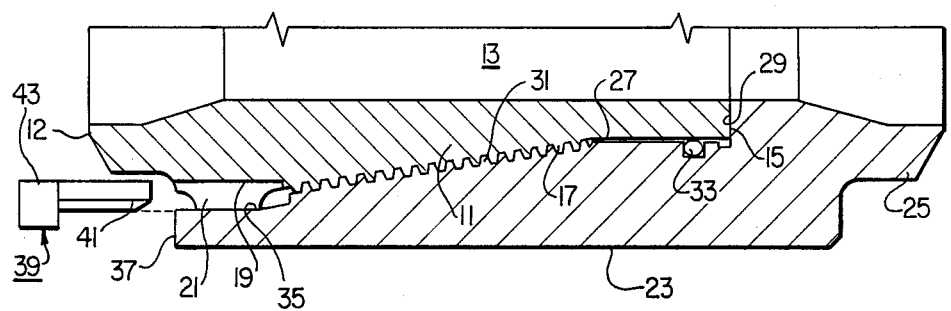
FIG. 1 is a partial sectional view illustrating a connection joint having a locking device constructed in accordance with this invention.

Referring to FIG. 1, pin 11 is a tubular member connected to a pipe 12. A bore 13 extends through the pin 11. The lower end of the pin 11 terminates in a nose 15. The nose 15 is a smooth cylindrical section. A set of threads 17 extend from the nose section 15 upward. Threads 17 are located on a frusto-conical portion of the pin 11. Threads 17 are preferably of a mustistart type.

The cylindrical portion of the pin 11 immediately above the threads 17 is a locking section 19. Locking section 19 has at least one slot 21 formed in the exterior surface of the pin 11. Slot 21 is a vertical or longitudinal channel, parallel to the axis of the pin 11.

Box 23 will releasably connect to the pin 11. Box 23 joins a pipe 25. A bore 27 extends through the box 23. An internal shoulder 29 serves as a stop for the pin nose 15 when the pin 11 and box 23 are fully made up. A set of threads 31 mate with the threads 17. Threads 31 are also located on a frusto-conical section and are of a multi-start type. The portion of the interior of the box 23 between the shoulder 29 and the lower end of the threads 31 is a smooth cylindrical surface. A seal 33 locates in this area for sealing against the nose section 15.

A lip section 35 extends from the upper end of the threads 31 to a rim 37 located on the upper end of the box 23. Lip section 35 is a smooth cylindrical section. It is closely spaced to the locking section 19 and overlaps the locking section 19. The inner wall of the lip section 35 defines an outer wall of a cavity for the slot 21.

Figure 2:
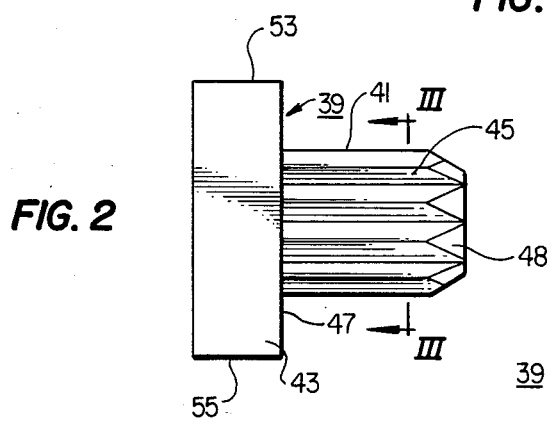
FIG. 2 is an enlarged front view of the key used with the connection joint of FIG. 1.

A key 39 locates in the slot 21. As shown in FIG. 2, key 39 has an integrally formed shank 41 and head 43. The shank 41 has a length slightly less than the longitudinal length of the slot 21. Shank 41 has a plurality of longitudinal grooves or teeth 45 formed on the outer side. The teeth 45 have a sharp gripping edge at the apex. Preferably, the teeth 45 are sawtooth in configuration with the flanks intersecting each other at an angle of about 90 degrees.

A single flat plane would touch the apex of each tooth 45. The teeth 45 engage a curved surface in the lip section 35, not a flat surface. However, the diameter of the box 23 is sufficiently large such that gripping action occurs, even though the teeth 45 are located on a flat surface, rather than a curved surface. The teeth 45 taper to a lesser thickness in the section 48 (FIG. 2) at the end opposite the head 43.

The opposite or inner side 46 of the shank 41 is a flat surface located a single plane. This inner side 46 mates with the inner side of each slot 21. That surface is a flat surface that has been machined into the pin 11. The distance between the apex of each tooth 45 and the side 46 is slightly greater than the radial distance between the inner wall of the lip section 35 to the base of the slot 21. This creates an interference fit. When blows are applied to the head 43, the teeth 45 will cut into the surface of the lip section 35 to provide a gripping force.

The head 43 is enlarged relative to the shank 41. A downward facing shoulder 47 contacts the rim 37 when the key 39 is in place. The inner wall 49 of the head 43 is flat and is located in the same plane as the inner side 46 of the shank 41. The outer wall 51 of the head 43 is also flat, providing a rectangular configuration to the head 43. The distance between the inner wall 49 and the outer wall 51 is greater than the radial width of the slot 21, so that the head 43 will overlap and contact the rim 37. Also, the side walls 53, 55 of the head 43 are at a greater distance apart than the width of the shank 41.

In operation, pin 11 stabs into the box 23. The operator rotates either the pin 11 or the box 23 relative to the other until the members are fully made up. This rotation will be only a fraction of a turn. Then the operator inserts the key 39 into the slot 21. He uses a hammer or the like to drive the key 39 downward into place. The teeth 45 will grip the inner wall at the lip section 35, locking the members together. When fully in place, the shoulder 47 of the head 43 will contact the box rim 37. If the joint needs to be loosened, a pry bar (not shown) can be used to locate between the shoulder 47 and the rim 37 to extract the key 39.

Figure 3:
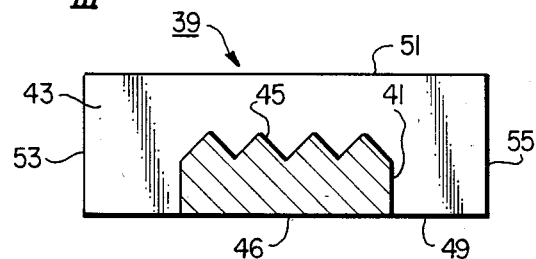
FIG. 3 is an end view of the key of FIG. 2.
Figure 4:
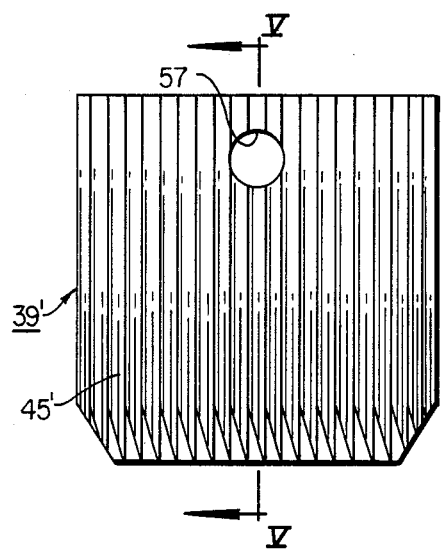
FIG. 4 is a front view of an alternate embodiment of the key of FIG. 2.
Figure 5:
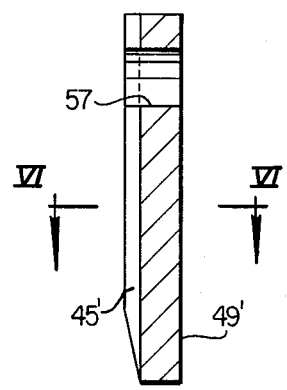
FIG. 5 is a sectional view of the key of FIG. 4, taken along the line V—V.
Figure 6:
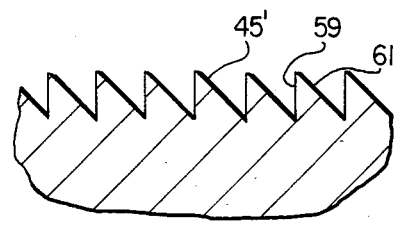
FIG. 6 is a sectional view of the key of FIG. 4, taken along the line VI—VI of FIG. 5.

In the embodiment of FIGS. 4–6, the key 39' does not have an enlarged head such as head 43 of the embodiment of FIGS. 1–3. When inserted into the slot 21 (FIG. 1), a portion of the key 39' will extend above the rim 37 (FIG. 1). A hole 57 is located in this portion. A tool (not shown) can be inserted in the hole 57 to withdraw the key 39' when the connection is to be broken.

The teeth 45' are saw-tooth in shape, as shown in FIG. 6, however, the flanks are not identical as in the embodiment of FIGS. 1–3. Referring to FIG. 6, one flank 59 is generally radial relative to the axis of the bore 13 (FIG. 1). That is, flank 59 is perpendicular to the inner wall 49' (FIG. 5). The other flank 61 inclines at a 45 degree angle relative to flank 59. The inclination of flank 61 points generally away from the direction of make-up rotation of the pin 11 in the box 23. For a right-hand make-up pin 11, the flanks 61 will incline to the left or counterclockwise.

The invention has significant advantages. The key positively locks the members together to prevent rotation. The rim and locking section of the box does not require tabs to be machined therein. This avoids weakening of this section of the box and subjecting it to damage.

While the invention has been shown in only one of its forms, it should be apparent to those skilled in the art that it is not so limited, but is susceptible to various changes and without departing from the scope of the invention.

We claim:

1. In a connection joint of the type including a first pipe having a pin member which has a longitudinal axis and an exterior surface containing a set of external threads for mating engagement with a second pipe containing a box member having a rim, an internal surface extending axially from the rim and containing a set of internal threads, an improved means for preventing the pin and box members from rotating relative to each other after make-up, comprising in combination:
   a lip section in the box member, the lip section being located in the internal surface and extending from the rim to the internal threads, the lip section having a smooth, continuous generally cylindrical configuration;
   a locking section on the pin member, the locking section having a smooth cylindrical configuration closely spaced from the lip section and extending axially from the external threads;
   a longitudinal slot formed in the locking section, extending from the rim toward the external threads parallel to the axis of the pin member, the slot and the internal surface of the pin member defining a cavity; and
   a key inserted into the cavity, the key having a slightly greater radial dimension than the radial extent of the cavity, so as to provide a gripping force.

2. In a connection joint of the type including a first pipe having a pin member which has an exterior surface containing a set of external threads for mating engagement with a second pipe containing a box member having a rim, an internal surface extending axially from the rim and containing a set of internal threads, an improved means for preventing the pin and box members from rotating relative to each other after make-up comprising in combination:
   a lip section in the box member, the lip section being located in the internal surface and extending from the rim to the internal threads, the lip section having a configuration of a smooth, continuous generally cylindrical surface;
   a locking section on the pin member, closely spaced from the lip section and extending axially from the external threads, the locking section having a configuration of a smooth cylindrical surface;
   an axially extending slot formed in the locking section of the pin member, defining a cavity with the surface of the lip section; and
   a key force into the cavity, the key having a shank containing on one side a plurality of longitudinally extending teeth for providing gripping edges to grip the surface located adjacent the slot to provide a gripping force to prevent rotation of the pin and box members relative to each other.

3. In a connection joint of the type including a first pipe having a pin member which has a lower end having an exterior surface containing a set of external threads for mating engagement with a second pipe containing a box member having an upper end terminating in a rim, an internal surface extending downward from the rim and containing a set of internal threads, an improved means for preventing the pin and box members from rotating relative to each other after make-up, comprising in combination:
   a lip section in the box member, the lip section being a smooth cylindrical bore located in the internal surface and extending from the rim to the internal threads;
   a locking section on the pin member, closely spaced from the lip section and extending upward from the external threads, the locking section being a smooth cylindrical surface;
   a longitudinally extending slot formed in the locking section, defining a cavity in combination with the bore of the lip section; and
   a key force into the cavity, the key having an upper end containing a head and a shank extending downward there from, the shank having an outer side containing a plurality of longitudinally extending teeth for providing gripping edges to grip the bore of the lip section to prevent rotation of the pin and box members relative to each other, the head protruding radially outward from the shank, defining a downward facing shoulder which contacts the rim so as to provide means for removing the key when it is desired to unscrew the box and pin members from each other.

4. In a connection joint of the type including a first pipe having a pin member which has an exterior surface containing a set of external threads for mating engagement with a second pipe containing a box member having a rim, the pin member connecting with the box member by rotation in a selected direction of make-up rotation, an internal surface extending axially from the rim and containing a set of internal threads, an improved means for preventing the pin and box members from rotating relative to each other after make-up comprising in combination:

a lip section in the box member, the lip section being located in the internal surface and extending from the rim to the internal threads, the lip section being a smooth continuous bore;

a locking section on the pin member, closely spaced from the lip section and extending axially from the external threads, the locking section being a smooth cylindrical surface;

an axially extending slot formed in the locking section, defining a cavity with the surface of the lip section;

a key forced into the cavity, the key having a shank with an outer side containing a plurality of longitudinally extending teeth for providing gripping edges to grip the surface of the lip section located adjacent the slot to provide a gripping force to prevent rotation of the pin and box members relative to each other; and each of the teeth having a pair of longitudinal flanks which intersect each other at an apex, one of the flanks being substantially perpendicular to the outer side of the shank, the other of the flanks inclining in a direction opposite to said selected direction of make-up rotation.

5. In a connection joint of the type including a first pipe having a pin member which has an exterior surface containing a set of external threads for mating engagement with a second pipe containing a box member having a rim, an internal surface extending axially from the rim and containing a set of internal threads, an improved means for preventing the pin and box members from rotating relative to each other after make-up, comprising in combination:

a lip section in the box member, the lip section being located in the internal surface and extending from the rim to the internal threads, the lip section being a smooth, continuous, generally cylindrical bore;

a locking section on the pin member, closely spaced from the lip section and extending axially from the external threads, the locking section being a smooth cylindrical surface;

an axially extending slot formed in the locking section, defining a cavity with the surface of the other lip section;

a key forced into the cavity, the key having a shank with an outer side containing a plurality of longitudinally extending teeth for providing gripping edges to grip the surface of the lip section located adjacent the slot to provide a gripping force to prevent rotation of the pin and box members relative to each other; and the shank having a length selected such that a portion protrudes above the rim of the box member when the shank is fully inserted within the slot, said portion having an aperture therethrough for receiving a tool to withdraw the key when the connection joint is to be broken, the aperture having an axis which is Perpendicular to the other side of the flank.

* * * * *

UNITED STATES PATENT OFFICE
CERTIFICATE OF CORRECTION

Patent No. 4,902,047            Dated 02/20/90

Inventor(s) Dale B. Marietta, Alistair MacDonald

It is certified that error appears in the above-identified patent and that said Letters Patent is hereby corrected as shown below:

Column 4, line 53 "force" is changed to --forced--;

Column 6, line 32, "Perpendicular" is changed to --perpendicular--

Signed and Sealed this

Thirtieth Day of April, 1991

Attest:

HARRY F. MANBECK, JR.

Attesting Officer

Commissioner of Patents and Trademarks